Patented Aug. 11, 1936

2,050,921

UNITED STATES PATENT OFFICE 2,050,921

MANUFACTURE OF COLORED LACQUERS AND COATING COMPOSITIONS

Achille Conzetti, Basel, Switzerland, assignor to the firm J. R. Geigy S. A., Basel, Switzerland No Drawing. Application December 12, 1933, Serial No. 702,097. In Germany December 19, 1932

10 Claims. (Cl. 134—79)

The most usual procedure for making colored lacquers, especially zapon lacquers, has consisted in mixing directly with the lacquer a finished dyestuff of any class, in so far as it is soluble in lacquers. In this manner there are obtained colored lacquers of various shades which, however, have not satisfied high demands in respect of fastness to light. Green lacquers fast to light have not hitherto been known, whilst the known blue lacquers have neither clear shades nor good fastness to light.

Notwithstanding the proposals made in German specifications No. 285,323 and No. 232,624, the alternative possibility, namely coloring the lacquers by so-called development of substances which yield dyestuffs in the lacquers themselves, has found no practical application.

This invention relates to a development process for coloring lacquers and other film-forming coating compositions which is based on a new chemical reaction. According to the invention a triarylmethane dyestuff containing an atomic grouping which combines with mordants is converted in the lacquer or composition itself by the action of chromic acid or a salt thereof into its colored complex chromium compound by merely mixing with chromic acid or a salt thereof in solid form a mixture of the lacquer and the dry dyestuff or its leuco compound and then gently warming.

The reaction is new and unexpected, since the complex chromium compounds of the aforesaid dyestuffs when made in any other manner (for example by the action of free chomic acid on a leuco-compound in water or by heating a solution of the dyestuff in ethyl lactate, glycerine or the like with sodium bichromate, whereby in the first case the product is obtained in crystalline form) and isolated in the dry state are completely insoluble in all lacquers.

It is therefore all the more remarkable that in the present invention there are produced directly soluble complex chromium dyestuffs whose shades are the same as those of the afterchromed dyeings on wool.

If the dyestuff is used in the form of its leuco compound, oxidation occurs by the chromic acid, whereupon formation of the complex chromium salt takes place.

In German specification No. 462,221 is described a process according to which rubber can be colored by precipitating the dyestuff in the form of a metal compound as a lake within an aqueous emulsion of the rubber. This process is fundamentally different from that of the present invention. As follows from Example 4 of the said German specification there is understood by the metal dyestuff lake the insoluble metal salt of a dyestuff (pigment) in which the metal atom is combined as an "ionogen", in contrast to the metal compounds of the present invention, in which the chromium is bound in complex form. Also the presence of water in the process of the said German specification is a condition which if applied in the process of the invention would in most cases rob the process of all practical result.

Furthermore, quite apart from the fact that a process for coloring rubber does not lead one directly to a process for coloring a transparent lacquer or varnish containing chlorinated rubber, there is nothing in the statements in the said German specification which could be said to suggest to the expert the process, following chemically quite another course, for coloring transparent zapon lacquers in accordance with the invention.

Practically all the dyestuffs which come into consideration in the present invention contain the orthocarboxyl group in the molecule as a mordanting group. It has been found that the property of this atomic grouping for forming complex salts which is here required remains even when the carboxyl group has been esterified.

As parent coating compositions there come into question the many film-forming lacquers and varnishes, such as acetyl cellulose lacquers and nitro cellulose lacquers, lacquers from artificial resins such as recyl resins, chlorinated rubber lacquers, gelatine solutions, spirit lacquers, linseed oil varnishes and printing varnishes.

The technical effect of the invention depends on the possibility of producing bright transparent lacquers, especially of blue, green and red shades, which are distinguished by an excellent fastness to light. This remarkable fastness to light is surprising because the same complex chromium salts when produced on wool by afterchroming are by far less fast to light.

The lacquers prepared in accordance with the invention may be mixed without difficulty with others prepared for instance from azo-dyestuffs.

The following examples illustrate the invention, the parts being by weight:

Example 1

0.5 gram of the leuco compound of Eriochromazurol B (Schultz, Farbstofftabellen 1931, No. 838) is dissolved in 100 grams of a nitro cellulose lacquer and the whole is gently warmed with 0.25 gram of sodium bichromate and 0.25 gram of oxalic acid, whereby development occurs and there is obtained a blue lacquer having a remarkable fastness to light.

The nitrocellulose lacquer may have, for example, the following composition:—

| | Parts |
|---|---|
| Collodion wool | 100 |
| Butanol | 100 |
| Ethyl lactate | 150 |
| Butyl acetate of 83 per cent strength | 250 |
| Ethyl alcohol | 375 |
| Triphenyl phosphate | 20 |
| Sipalin | 5 |

Example 2

1 gram of the leuco compound from 1 molecule of 2-chloro-4-dimethylaminobenzaldehyde and 2 molecules of ortho-cresotinic acid (made according to German specification No. 198,729) is dissolved in 100 grams of an acetyl cellulose lacquer, 0.5 gram of sodium bichromate and 0.5 gram of oxalic acid are added and the whole is gently warmed. There is produced a violet lacquer having a good fastness to light.

The acetyl cellulose lacquer may have for example the following composition:—

| | Parts |
|---|---|
| Acetyl cellulose | 50 |
| Ethyl lactate | 300 |
| Ethyl formate | 120 |
| Acetone | 500 |
| Triphenyl phosphate | 20 |
| Tricresyl phosphate | 10 |

Example 3

0.5 gram of the leuco compound from 1 molecule of ortho-chlorobenzaldehyde and 2 molecules of ortho-cresotinic acid (prepared according to German specification No. 198,909) is dissolved in a chlorinated rubber lacquer, 0.25 gram of sodium bichromate and 0.25 gram of oxalic acid are added and the whole is gently warmed. There is produced a blue lacquer which is fast to light.

The chlorinated rubber lacquer may have for example the following composition:—

| | Parts |
|---|---|
| Solution of 17.2 per cent strength of chlorinated rubber in chlorobenzene | 600 |
| Ethyl lacetate | 300 |
| Benzene | 100 |

Example 4

0.5 gram of the leuco compound from 1 molecule of 5-dinitro-phenylamino-2:6-dichlorobenzaldehyde and 2 molecules of ortho-crestotinic acid (prepared according to German specification No. 235,155) is dissolved in 100 grams of a nitrocellulose lacquer, 0.25 gram of sodium bichromate and 0.25 gram of oxalic acid are added and the whole is gently warmed. There is obtained a green lacquer of good fastness to light.

Example 5

0.5 gram of the leuco-compound from 1 molecule of the azo-dyestuff from 5-amino-2:6-dichlorobenzaldehyde and pyrazolone and 2 molecules of ortho-cresotinic acid (prepared according to German specification No. 226,348) is dissolved in 100 grams of an acetyl cellulose lacquer and the whole is gently warmed together with 0.25 gram of sodium bichromate and 0.25 gram of oxalic acid. There is obtained a green lacquer of good fastness to light.

Example 6

1 gram of Eriochromazurol B (Schultz, Farbstofftabellen, 1931, No. 838) is dissolved in 100 grams of a nitrocellulose lacquer and the whole is gently warmed with 0.5 gram of sodium bichromate. There is obtained a brilliant clear blue lacquer of remarkable fastness to light.

The nitrocellulose lacquer may have for example the following composition:—

| | Parts |
|---|---|
| Collodion wool moistened with butanol | 155 |
| Butyl acetate | 400 |
| Dibutyl phthalate | 20 |
| Tricresyl phosphate | 25 |
| Ethyl alcohol of 96 per cent strength | 400 |

Example 7

0.25 gram of the free dyestuff acid of Eriochromazurol B and 100 grams of a nitro-cellulose lacquer are shaken together for ¼ hour at ordinary temperature in a shaking apparatus, 0.125 gram of sodium bichromate is added and the whole is heated on a water bath at 40–60° C. for ¼ hour. There is obtained a clear brilliant blue lacquer of remarkable fastness to light.

The nitrocellulose lacquer may have for example the following composition:—

| | Parts |
|---|---|
| Collodion wool moistened with butanol | 155 |
| Recyl No. 19 | 150 |
| Recyl balsam No. 33 | 80 |
| Ethyl lactate | 200 |
| Butyl acetate | 100 |
| Acetone | 100 |
| Benzene | 215 |

Example 8

0.5 gram of the ethyl ester of Eriochromazurol B is dissolved in 100 grams of a nitrocellulose lacquer and the whole is gently warmed with 0.25 gram of sodium bichromate to produce a violet lacquer of good fastness to light.

Example 9

0.5 gram of the dyestuff from 1 molecule of ortho-chlorobenzaldehyde and 2 molecules of ortho-cresotinic acid (prepared according to German specification No. 198,909) is dissolved in a chlorinated rubber lacquer and the whole is gently warmed with 0.25 gram of sodium bichromate to produce a pure blue lacquer.

Example 10

0.25 gram of the dyestuff acid of Eriochromcyanin R (Schultz, Farbstofftabellen 1931, No. 840) is dissolved in an artificial resin lacquer, 0.125 gram of sodium bichromate is added and the whole is converted into a reddish-blue lacquer by gently warming.

The artificial resin lacquer may have for example the following composition:—

| | Parts |
|---|---|
| Recyl resin 1102 | 300 |
| Ethyl lactate | 300 |
| Toluene | 300 |
| Acetone | 100 |

Example 11

0.25 gram of the dyestuff acid of Eriochromgeranol R (Schultz, Farbstofftabellen 1931, No. 849) is dissolved in 100 grams of a spirit lacquer, 0.125 gram of sodium bichromate is added and the whole is heated gently at 40-60° C. to produce a red-violet lacquer.

The spirit lacquer may have for example the following composition:—

| | Parts |
|---|---|
| Sandarac | 240 |
| Turpentine resin | 60 |
| Triphenyl phosphate | 30 |
| Alcohol | 670 |

Example 12

1 gram of the dyestuff from 1 molecule of 5-oxy-2:6-dichlorobenzaldehyde and 2 molecules of ortho-cresotinic acid (prepared according to German specification No. 244,826) is dissolved in a warm solution of gelatine, 0.5 gram of sodium bichromate and 0.5 gram of oxalic acid are added and the whole is further heated to convert the dyestuff into the blue chromium compound. By pouring the colored gelatine solution so obtained and drying there is obtained a film of quite remarkable fastness to light.

The gelatine solution may consist of 100 parts of gelatine and 900 parts of water.

Example 13

5 grams of the dyestuff from 1 molecule of 5-oxy-2:4:6-trichlorobenzaldehyde and 2 molecules of orthocresotinic acid (prepared according to German specification No. 199,934) are dissolved in or made into a paste with 100 grams of a printing varnish, 2.5 grams of sodium bichromate are added and the whole is heated at 70° C. for ½ hour. The blue dyestuff yields printings of very good fastness to light.

The linseed oil printing varnish ink may consist of 900 parts of printing varnish and 100 parts of ethyl lactate.

Example 14

0.5 gram of the azotriphenyl-methane dyestuff from 1 molecule of 5-amino-2:6 dichlorobenzaldehyde, 1 molecule of phenyl methyl pyrazolone and 2 molecules of ortho-cresotinic acid (prepared according to German specifications No. 223,879 and No. 226,348) is dissolved in 100 grams of a nitrocellulose lacquer, 0.25 gram of sodium bichromate is added and the whole is gently warmed to produce green lacquer.

Example 15

0.5 gram of the dyestuff from 1 molecule of 5-dinitro phenylamino-2:6-dichlorobenzaldehyde and 2 molecules of ortho-cresotinic acid (prepared according to German specification No. 235,155) is dissolved in 100 grams of a nitrocellulose lacquer, 0.25 gram of sodium bichromate is added and the whole is gently warmed to produce a green lacquer whose fastness to light is good.

Example 16

0.5 gram of Naphthochrome Blue B N (Schultz, Farbstofftabellen, 1931, No. 852) is dissolved in 100 grams of a nitrocellulose lacquer, 0.25 gram of sodium bichromate is added and the whole is gently warmed. There is obtained a blue lacquer of good fastness to light.

Example 17

0.5 gram of Naphthochrome Green G (Schultz, Farbstofftabellen, 1931, No. 851) is dissolved in 100 grams of an acetyl cellulose lacquer, 0.25 gram of sodium bichromate is added and the whole is gently warmed. There is obtained a brilliant green lacquer of very good fastness to light.

Example 18

0.5 gram of the dyestuff made as described in Example 1 of German specification No. 123,077 from dimethyl- or diethylaminooxybenzoylbenzoic acid and β-resorcylic acid in presence of sulphuric acid is dissolved in 100 grams of a nitrocellulose lacquer, 0.25 gram of sodium bichromate is added and the whole is gently warmed. There is obtained a brilliant blue-red lacquer whose fastness to light is very good.

What I claim is:—

1. A process for the manufacture of complex compounds containing a triarylmethane dyestuff, chromium and a cellulose derivative, consisting in treating the dyestuff acid of a triarylmethane dyestuff which contains at least one times in the molecule the groups OH and COOH in ortho position to one another, in presence of a cellulose derivative with a salt of chromic acid.

2. A process for the manufacture of complex compounds containing a triarylmethane dyestuff, chromium and a cellulose derivative, consisting in treating the dyestuff acid of a triarylmethane dyestuff which contains at least one times in the molecule the groups OH and COOH in ortho position to one another, in the presence of a nitrocellulose with a salt of chromic acid.

3. A process for the manufacture of complex compounds containing a triarylmethane dyestuff, chromium and a cellulose derivative, consisting in treating the dyestuff acid of a triarylmethane dyestuff which contains at least one times in the molecule the groups OH and COOH in ortho position to one another, in presence of acetylcellulose with a salt of chromic acid.

4. A process for the manufacture of complex compounds containing a triarylmethane dyestuff, chromium and a cellulose derivative, consisting in treating the dyestuff acid of Eriochromazurol B (Schultz, Farbstofftabellen, 1931, No. 838) in presence of nitrocellulose with sodium bichromate.

5. A process for the manufacture of complex compounds containing a triarylmethane dyestuff, chromium and a cellulose derivative, consisting in treating the dyestuff acid of Eriochromazurol B (Schultz, Farbstofftabellen, 1931, No. 838) in presence of acetylcellulose with sodium bichromate.

6. A process for the manufacture of complex compounds containing a triarylmethane dyestuff, chromium and a cellulose derivative, consisting in treating the dyestuff acid of Naphthochrome Green G (Schultz, Farbstofftabellen, 1931, No. 851) in presence of nitrocellulose with sodium bichromate.

7. A process for the manufacture of complex compounds containing a triarylmethane dyestuff, chromium and a cellulose derivative, consisting in treating the dyestuff acid of Napthochrome Green G (Schultz, Farbstofftabellen, 1931, No. 851) in presence of acetylcellulose with sodium bichromate.

8. A process for the manufacture of complex compounds containing a triarylmethane dyestuff, chromium and a cellulose derivative, consisting in treating the dyestuff from dialkylaminooxybenzoylbenzoic acid and β-resorcylic acid in presence of nitrocellulose with sodium bichromate.

9. A process for the manufacture of complex compounds containing a triarylmethane dyestuff, chromium and a cellulose derivative, consisting in treating the dyestuff from dialkylaminooxybenzoylbenzoic acid and β-resorcylic acid in presence of acetylcellulose with sodium bichromate.

10. The colored complex compounds from a triarylmethane dyestuff, having at least one times in the molecule the groups OH and COOH in ortho position to one another, chromium and a cellulose derivative, said compounds being soluble with intense, bright colorations in esters of organic acids and phenols used for the preparation of lacquers, and mixtures thereof.

ACHILLE CONZETTI.